United States Patent [19]

DeRudder et al.

[11] Patent Number: 4,927,880

[45] Date of Patent: May 22, 1990

[54] LOW GLOSS MOLDED ARTICLES USING POLYORGANOSILOXANE/POLYVINYL-BASED GRAFT POLYMERS

[75] Inventors: James L. DeRudder, Mt. Vernon, Ind.; Herman Savenije, Bergen op Zoom, Netherlands; I-Chung W. Wang, Williamstown, Mass.

[73] Assignee: General Electric Company, Parkersburg, W. Va.

[21] Appl. No.: 271,222

[22] Filed: Nov. 14, 1988

[51] Int. Cl.$^5$ ............................................. C08L 51/08
[52] U.S. Cl. ...................................... 525/63; 524/262; 524/267; 524/403
[58] Field of Search ................... 525/63; 524/267, 262, 524/403

[56] References Cited

U.S. PATENT DOCUMENTS

| | | | |
|---|---|---|---|
| 2,465,319 | 3/1949 | Whinfield et al. | 260/75 |
| 2,550,139 | 4/1951 | Daly | 260/45.5 |
| 2,698,313 | 12/1954 | Daly | 260/45.5 |
| 2,713,566 | 7/1955 | Reid | 260/45.5 |
| 2,820,773 | 1/1958 | Childers et al. | 260/45.5 |
| 2,891,920 | 6/1959 | Hyde et al. | 260/29.2 |
| 2,901,466 | 8/1959 | Kilber et al. | 260/75 |
| 2,908,661 | 10/1959 | Calvert | 260/45.5 |
| 3,047,539 | 7/1962 | Pengilly | 260/75 |
| 3,220,972 | 11/1965 | Lamoreaux | 260/46.5 |
| 3,271,367 | 9/1966 | Schnell et al. | 260/49 |
| 3,306,874 | 2/1967 | Hay | 260/47 |
| 3,306,875 | 2/1967 | Hay | 260/47 |
| 3,737,409 | 6/1973 | Fox | 260/49 |
| 3,775,452 | 11/1973 | Karstedt | 260/429 |
| 3,780,140 | 12/1973 | Hammer | 260/884 |
| 3,898,300 | 8/1975 | Hilliard | 260/827 |
| 4,071,577 | 1/1978 | Falender et al. | 260/827 |
| 4,536,542 | 8/1985 | Allen | 525/146 |
| 4,556,705 | 12/1985 | McCready | 528/289 |

FOREIGN PATENT DOCUMENTS

| | | |
|---|---|---|
| 0166900 | 1/1986 | European Pat. Off. . |
| 0246537 | 11/1987 | European Pat. Off. . |
| 0249964 | 12/1987 | European Pat. Off. . |
| 0260552 | 3/1988 | European Pat. Off. . |
| 1590549 | 6/1981 | United Kingdom . |

OTHER PUBLICATIONS

D. Gravier et al., Rubber Chem. Tech., 56(5), 918, (1983).

*Primary Examiner*—Melvyn I. Marquis
*Attorney, Agent, or Firm*—Hedman, Gibson, Costigan & Hoare

[57] ABSTRACT

Articles made from normally glossy thermoplastic polymer resins are flatted to reduce gloss by the addition of multi-stage polyorganosiloxane/polyvinyl-based graft polymer flatting agent compositions.

40 Claims, No Drawings

LOW GLOSS MOLDED ARTICLES USING POLYORGANOSILOXANE/POLYVINYL-BASED GRAFT POLYMERS

CROSS-REFERENCE TO RELATED APPLICATIONS

This application is related to the following commonly owned, concurrently-filed U.S. patent application:

| U.S. SER. NO. | SUBJECT MATTER | APPLICANT(S) |
| --- | --- | --- |
| 07/271,250 | Polyorganosiloxane/polyvinyl-based Graft Polymers, Process and Thermoplastic Compositions Containing the Same | I-C. W. Wang |
| 07/271,223 | Thermoplastic Molding Compositions Containing Polyorganosiloxane/polyvinyl-based Graft Polymer Modifiers | J. L. DeRudder<br>F. J. Traver<br>I-C. W. Wang |
| 07/271,249 | Polyphenylene ether or Polyphenylene ether/Polystyrene with Polyorganosiloxane/polyvinyl-based Graft Polymer Modifiers | M. A. Alsamarraie<br>W. R. Haaf<br>W. J. Peascoe<br>I-C. W. Wang |
| 07/271,248 | Polyorganosiloxane/polyvinyl-based Graft (meth)acrylate Polymers | M. A. Alsamarraie<br>S. V. Hobbs<br>I-C. W. Wang<br>V. H. Watkins |
| 07/271,247 | Polyester, Polycarbonate and/or Polyphenylene ether with Polyorganosiloxane/polyvinyl-based Graft (meth)acrylate Polymers | M. A. Alsamarraie<br>S. Y. Hobbs<br>I-C. W. Wang<br>V. H. Watkins |
| 07/271,230 | Flame retardant Polyorganosiloxane-based Graft Polymers | I-C. W. Wang |
| 07/271,246 | Polycarbonate And Polyester Blends Modified with Polyorganosiloxane Graft Polymers Combined with Diene Rubber-Based Graft Polymers | J. L. DeRudder<br>I-C. W. Wang |
| 07/271,896 | Polyesters Modified with Polyorganosiloxane/polyvinyl-based Graft Polymers | J. L. DeRudder<br>I-C. W. Wang |

FIELD OF THE INVENTION

This invention relates to articles having a flatted surface prepared by extruding, molding or heat forming thermoplastic polyorganosiloxane/polyvinyl-based graft polymer composition. Novel articles and a method for their making are disclosed.

BACKGROUND OF THE INVENTION

Novel articles have been discovered having a flatted surface comprising thermoplastic polymer resins and an effective amount of a novel multi-stage polyorganosiloxane/polyvinyl-based graft polymer flatting agent. Many benefits can be realized from articles containing this new polyorganosiloxane/polyvinyl-based graft polymer flatting agent. For example, the flatting agent lends improved impact strength to the articles as well as reduced gloss.

Many thermoplastic polymers when thermoformed by casting or molding, and especially injection molding, calendering and extrusion, and the like, have smooth glossy surfaces. While such surfaces are highly desirable in many applications, there are certain cases wherein they are distinctly disadvantageous. For example, glossy surfaces resist painting because the paints, inks and varnishes tend not to adhere; smooth surfaces mar and abrade, developing a hazy appearance; smooth thermoplastic surfaces tend to stick together when stacked, the so-called blocking phenomenon, and smooth surfaces reflect light. Light reflection, especially, is a problem because this can cause operators of business machines molded with glossy surfaces to become tired after prolonged usage, because stray light is reflected into their eyes.

Thermoplastics for which surface altering is especially needed are those which injection mold into high strength pieces having highly glossy surfaces. These include the engineering thermoplastics, such as aromatic polycarbonates; polyester carbonates; aromatic polysulfone carbonates; polyester resins comprising units of an aliphatic diol, a cycloaliphatic diol or a mixture of such diols and an aromatic diacid; vinyl aromatic polymers; polyphenylene ethers, mixtures of any of the foregoing and the like. Business machine housings, especially cathode ray tube housings, and picture tube protective shields, molded from such polymers have a high specular gloss at 60 degrees, according to ASTM Standard Test Method D 523, and a significant reduction in such gloss is desirable, while still maintaining all of the other valuable properties of such materials, especially strength and flame retardancy, in certain embodiments.

Previous approaches to altering the surface of thermoplastics have involved the use of additives or mechanical treatments such as calendering or sandblasting. The mechanical treatments cannot generally be used in injection molding and extrusion processes. With respect to the additive approach, this generally comprises using inorganic particulate materials, such as calcium silicates, magnesium silicates, amorphous silica gels and the like. Although these work rather well in plasticized poly(vinyl chloride) resins, they are difficult to compound into the high melting engineering thermoplastics which are used in high quality business machine housings, and the like. The difficulty is in obtaining uniformly dispersed particles on the surface of the articles so that predictable gloss reduction is obtained, while at the same time not reducing physical strength. Other additives have been proposed, selected from organic polymeric materials. Canadian Pat. No. 1,049,185, for example, describes cross-linked acrylate polymers, and states that they are useful in a wide range of thermoplastics, including polycarbonates and mixtures thereof, but then goes on to state that the cross-linked polymer should be particulate in form, having an average particle size of 1 to 30 microns. This causes the same difficulty in dispersion and non-uniform gloss-reduction as is commonly experienced when particulate inorganic additives are employed and the resulting composition is injection molded and/or extruded. A further approach suggested for use in poly(vinyl chloride) compounds used in house siding and other rigid profile extrusions, is to blend into the vinyl halide resin a small amount of an impact modifier, such as ethylene/vinyl acetate copolymer and then to add a dulling agent. In a Technical Bulletin on terpolymer resin modifiers, ELVALOY 837 and 838, the DuPont Company has suggested that if a terpolymer of ethylene, vinyl acetate and carbon monoxide is used in poly(vinyl chloride) a desirable matte finish can be obtained without dulling agents. Compositions comprising such terpolymers and a wide variety of other resins, especially poly(vinyl chloride) resins, but including polycarbonates and polyesters, are taught in Hammer, U.S. Pat. No. 3,780,140, but there is no suggestion therein that molded articles having reduced gloss can be obtained without a dulling agent.

Allen, et al., in commonly assigned, U.S. Pat. No. 4,536,542, discloses the use of a terpolymer comprising ethylene, a carbon monoxide and a third monomer as a flatting agent to achieve desired altering of the surface of the article.

There have also been many attempts in the art to provide polyorganosiloxane-based graft polymers which may be useful as impact strength modifiers for thermoplastic resins. See, for example, U.S. Pat. No. 2,891,920 (J. F. Hyde, et al.); and O. Graiver, et al., Rubber Chem. Tech., 56 (5), 918 (1983).

The major deficiencies which have prevented the widespread use of polyorganosiloxane impact modifiers in thermoplastic resins have included raw material and the thermoplastic resin. Additionally, the siloxane polymerization process requires careful control to eliminate contamination of the silicone rubber by linear or cyclic siloxane oligomers. Surface delamination in molded thermoplastic parts has been partially attributed to the presence of such oligomer contaminants in the silicone rubber.

Furthermore, polyorganosiloxane compounds generally exhibit low reactivity toward vinyl monomers during the course of subsequent graft polymerization. Several methods for improving graft efficiency have been reported. U.S. Pat. No. 3,898,300 states that a polyorganosiloxane-based graft copolymer for improving the impact strength of S/AN resin is formed by grafting S/AN comonomers in an emulsion system onto the vinylsiloxane- or allylsiloxane-containing silicone substrates. U.S. Pat. No. 4,071,577 describes a similar approach by using a mercaptosiloxane in place of vinyl-group containing siloxanes. European Patent Application No. 0,166,900 reports further improvement of polysiloxane-based graft polymers and increased S/AN impact strength by using an acryloxy-functionalized siloxane as the graft-linking agent. These graft polymers are utilized in connection with the impact modification of S/AN. British Pat. No. 1,590,549 describes the use of a polyorganosiloxane graft polymer in various plastic molding compositions. Similarly, European Patent Application No. 0,249,964 describes the use of a polyorganosiloxane graft polymer in the polycarbonate containing blends..

Mention is also made of European Patent Application Nos. 0,246,537 and 0,260,552, both of which describe the use as impact modifiers of a polyorganosiloxane polymer substrate on which are subsequently grafted first and second vinyl-based polymer stages. The second of said applications also describes soaking the first stage substrate with the second stage monomer(s) to cause an "entangling" thereof with the silicone prior to subsequently polymerizing the second stage.

The polyorganosiloxane-based rubber utilized in the foregoing references tends to have poor mechanical properties, poor appearance properties, a tendency to cause delamination in final molded products and generally offers poor impact strength performance in typical thermoplastic applications.

Each of these disadvantages can be overcome by improving the elastomeric properties of the rubber. Each objective can be accomplished by the practice of the present invention, where polyorganosiloxane rubber substrate is replaced by co-homopolymerized network(s) of polyorganosiloxane/polyvinyl-based polymer(s) in a co-homopolymerization process. Polyorganosiloxane/polystyrene-based co-homopolymers are particularly preferred for use in the first stage of the graft polymers of the present invention.

None of the references disclose the in-situ co-homopolymerization of vinyl-based monomers in the presence of siloxanes in an emulsion system, as described hereinbelow. Furthermore, the present invention is also directed to the graft polymers provided by subsequent graft polymerization of vinyl aromatic-based monomers (e.g. polystyrene, styrene/acrylonitrile copolymer, styrene/divinylbenzene copolymer or styrene/acrylonitrile/divinylbenzene terpolymer) in the presence of the polyorganosiloxane/polyvinyl-based polymer product of the foregoing step.

Surprisingly, novel, extruded, molded or heat formed articles having a flatted surface can be prepared from thermoplastic resins comprising an effective amount of polyorganosiloxane/polyvinyl-based graft polymers as a flatting agent. Unexpectedly, articles comprising this flatting agent are also seen to have an increase in impact strength. None of the prior art attempts at gloss reduction suggest that the use of a polyorganosiloxane-based composition as a flatting agent would have any effect on the surface gloss properties of articles comprising such compositions.

SUMMARY OF THE INVENTION

According to the present invention there are provided extruded, molded or heat formed articles having a flatted surface comprising:

(A) a thermoplastic polymer resin selected from an aromatic polycarbonate; a polyester carbonate; an aromatic dihydric phenyl sulfone carbonate polymer; a polyester resin comprising units of an aliphatic diol, a cycloaliphatic diol or a mixture of such diols, and an aromatic diacid; a poly(etherimide ester) elastomer; vinyl aromatic polymer; a polyphenylene ether; or a mixture of any of the foregoing; and an effective, flatting amount of a flatting agent comprising a multi-stage polyorganosiloxane/polyvinyl-based graft polymer composition (B) comprising:

(a) as a first stage, a polymeric co-homopolymerized substrate comprised of, in combination, an organosiloxane polymer, at least one vinyl-based polymer, and optionally units derived from a cross-linking agent or agents; units which serve as a graft-linking agent or agents; units derived from a cross-linking agent or agents and graft-linking agent or agents, or a mixture of any of the foregoing units; and (b) at least one subsequent stage or stages graft polymerized in the presence of any previous stages and which is comprised of a vinyl-based polymer or a cross-linked vinyl-based polymer the outermost stage being comprised of a vinyl aromatic-based polymer or a cross-linked vinyl aromatic-based polymer.

Preferably the thermoplastic polymer resin comprises an aromatic polycarbonate, a styrene/acrylonitrile copolymer, a poly(1,4-butylene terephthalate), a poly(etherimide ester) elastomer, a polyphenylene ether, a polystyrene or a mixture of any of the foregoing. Especially preferred are poly(bisphenol-A A carbonate) and styrene/acrylonitrile copolymer resins.

Preferred multi-stage polyorganosiloxane/polyvinyl-based co-homopolymer composition proportions comprise approximately 30 to 90 weight percent of the first stage substrate (B)(a) based upon the weight of the first stage substrate (B)(a) and any subsequent graft stage or stages taken together, and preferably the first stage substrate (B)(a) comprises approximately 5 to 45 weight percent vinyl-based polymer.

In preferred embodiments, the organosiloxane polymer is comprised primarily of units of the formula $R_nSiO_{(4-n)/2}$ wherein R is hydrogen or a monovalent hydrocarbon radical of about 1 to 16 carbon atoms and n is 0, 1 or 2; the vinyl-based polymer of the first stage comprises alkenyl aromatic units, especially polystyrene, poly(meth)acrylate units or mixtures thereof, or in addition to the alkenyl aromatic units, the vinyl-based polymer component also comprises divinylbenzene and the vinyl aromatic-based polymer of the outermost stage comprises polystyrene or styrene/acrylonitrile copolymer.

In other preferred features, the subsequent stages of component (B) comprise: (b)(i) a second stage comprising at least one polymer and optionally units derived from a cross-linking agent or agents, units which serve as a graft-linking agent or agents, units derived from a cross-linking agent or agents and units from the same agent or agents which serve as a graft-linking agent or agents, or a mixture of any of the foregoing; and (b)(ii) a third stage comprising at least one vinyl aromatic-based polymer or a cross-linked vinyl aromatic-based polymer. Preferably the subsequent stage ratio of first stage substrate polymer (B)(a) to second stage polymer (b)(i) is 10:90 to 90:10 and the amount of third stage (b)(ii) comprises from about 10 to about 90 parts by weight per 100 parts by weight of (B)(a), (b)(i), and (b)(ii) combined. Especially preferred are subsequent stages comprising a crosslinked butyl acrylate polymer second stage and a styrene/acrylonitrile copolymer third stage.

Also contemplated are articles wherein the thermoplastic polymer resin also comprises an effective amount of a flame retardant agent.

Also, according to the present invention, there are provided methods for preparing articles having a flatted surface comprising extruding, molding or heat forming a blended composition, said blended composition comprising:

(A) a thermoplastic polymer resin selected from an aromatic polycarbonate; a polyester carbonate; an aromatic dihydric phenyl sulfone carbonate polymer; a polyester resin comprising units of an aliphatic diol, a cycloaliphatic diol or a mixture or such diols, and an aromatic diacid; a poly(etherimide ester) elastomer; a vinyl aromatic polymer; a polyphenylene ether or a mixture of any of the foregoing; and blending with said thermoplastic polymer composition, before or during processing, an effective, flatting amount of a multi-stage polyorganosiloxane/polyvinyl-based graft polymer composition (B) comprising:

(a) as a first stage, a polymeric co-homopolymerized substrate comprised of, in combination, an organosiloxane polymer; and at least one vinyl-based polymer; and optionally units derived from a cross-linking agent or agents; units which serve as a graft-linking agent or agents; units derived from a cross-linking agent or agents and graft-linking agent or agents; or a mixture of any of the foregoing; and (b) at least one subsequent stage or stages graft polymerized in the presence of any previous stages and which is comprised of a vinyl-based polymer or a cross-linked vinyl-based polymer, the outermost stage being comprised of a vinyl aromatic-based polymer or a cross-linked vinyl aromatic-based polymer.

Preferably the method produces a flatted article exhibiting a 60 degree gloss value of no greater than about 75 percent as measured by ASTM D-523 on a Gardner glossometer.

DETAILED DESCRIPTION OF THE INVENTION

With respect to component (A), this can comprise an aromatic polycarbonate resin, which can be made by those skilled in this art or can be obtained from a variety of commercial sources. They may be prepared by reacting a dihydric phenyl with a carbonate precursor, such as phosgene, a haloformate or a carbonate ester. Typically, they will have recurring structural unit of the formula:

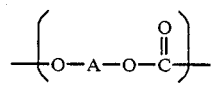

wherein A is a divalent aromatic radical of the dihydric phenyl employed in the polymer producing reaction. Preferably, the aromatic carbonate polymers have an intrinsic viscosity ranging from 0.30 to 1.0 dl/g (measured in methylene chloride at 25° C.) By dihydric phenyls is meant mononuclear or polynuclear aromatic compounds containing two hydroxy radicals, each of which is attached to a carbon atom of an aromatic nucleus. Typical dihydric phenyls include 2,2-bis-(4-hydroxyphenyl)-propane; 2,2-bis-(3,5-dimethyl-4-hydroxyphenyl)propane; 4,4'-dihydroxydiphenyl ether; bis(2-hydroxyphenyl)methane; mixtures thereof and the like. The preferred aromatic carbonate polymer for component (A) is a homopolymer derived from 2,2-bis-(4-hydroxy-phenyl)propane(bisphenyl-A).

Poly(ester carbonates) for use in the invention are known and can be obtained commercially. Generally, they are copolyesters comprising recurring carbonate groups:

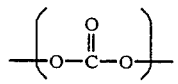

carboxylate groups

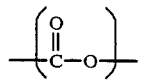

and aromatic carbocyclic groups in the linear polymer chain, in which at least some of the carboxylate groups and at least some of the carbonate groups are bonded directly to ring carbon atoms of the aromatic carbocyclic groups. These poly(ester carbonate) copolymers, in general, are prepared by reacting a difunctional carboxylic acid, such as phthalic acid, isophthalic acid, terephthalic acid, homophthalic acid, o-, m-, and p-phenylenediacetic acid, the polynuclear aromatic acids, such as diphenic acid, and 1,4-naphthalic acid, mixtures of any of the foregoing, and the like, with a dihydric phenyl and a carbonate precursor, of the types described above. A particularly useful polyester carbonate is derived from bisphenol-A, terephthaloyl dichloride, isophthaloyl dichloride, or a mixture thereof, and phosgene. The molar proportions of dihydroxydiaryl units to benzenedicarboxylate units to carbonate units can range from 1:0.30–0.80:0.70–0.20 and the molar range of terephthalate units to isophthalate units can range from 9:1 to 2:8 in this preferred family of resins.

The aromatic dihydric phenyl sulfone polymer resins used in component (A) are a family of resins which can be made by those skilled in this art. For example homopolymers of dihydric phenol, and a dihydroxydiphenyl sulfone and a carbonate precursor can be prepared as well as copolymers of a dihydric phenol and a carbonate precursor can be made according to the description in Schnell, et al., U.S. Pat. No. 3,271,367. A preferred material is made by polymerizing bis-(3,5-di-methyl-4hydroxyphenyl)sulfone, alone, or especially in combination with bisphenol-A with phosgene or a phosgene precursor, in accordance with the description in Fox, U.S. Pat. No. 3,737,409. Especially preferred is a copolymer made by reacting 40 to 99 weight percent of the sulfone, 1 to 60 weight percent of the bisphenol with phosgene.

Polyesters suitable for use in component (A) are derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid have repeated units of the following general formula:

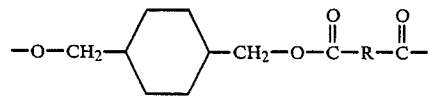

wherein n is an integer of from 2 to 4. The most preferred polyester is poly(ethylene terephthalate).

Also contemplated herein are the above polyesters with minor amounts, e.g., from 0.5 to about 2 percent by weight, of units derived from aliphatic acid and/or aliphatic polyols, to form copolyesters. The aliphatic polyols include glycols, such as poly(ethylene glycol). All such polyesters can be made following the teachings of, for example, U.S. Pat. Nos. 2,465,319 and 3,047,539.

The polyesters which are derived from a cycloaliphatic diol and an aromatic dicarboxylic acid are prepared, for example, by condensing either the cis- or trans-isomer (or mixtures thereof) of, for example, 1,4-cyclohexanedimethanol with an aromatic dicarboxylic acid so as to produce a polyester having recurring units of the following formula:

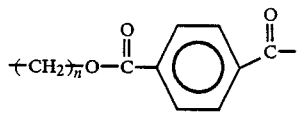

wherein the cyclohexane ring is selected from the cis- and trans-isomers thereof and R represents an aryl radical containing 6 to 20 carbon atoms and which is the decarboxylated residue derived from an aromatic dicarboxylic acid.

Examples of aromatic dicarboxylic acids represented by the decarboxylated residue R are isophthalic or terephthalic acid, 1,2-di-(p-carboxyphenyl) ethane, 4,4'-dicarboxydiphenyl ether, etc., and mixtures of these. All of these acids contain at least one aromatic nucleus. Acids containing fused rings can also be present, such as in 1,4- or 1,5-naphthalenedicarboxylic acids. The preferred dicarboxylic acids are terephthalic acid or a mixture of terephthalic and isophthalic acids.

Another preferred polyester may be derived from the reaction of either the cis- or trans-isomer (or a mixture thereof) of 1,4-cyclohexanedimethanol with a mixture of isophthalic and terephthalic acids. Such a polyester would have repeating units of the formula:

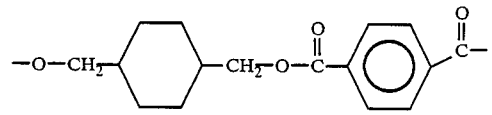

Still another preferred polyester is a copolyester derived from a cyclohexanedimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having units of the following formula:

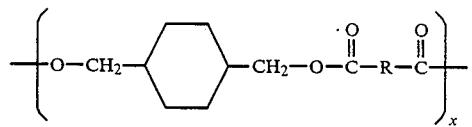

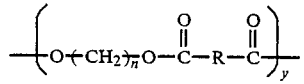

wherein the cyclohexane ring is selected from the cis- and trans-isomers thereof, R is as previously defined, n is an integer of 2 to 4, the x units comprise from about 10 to about 90 percent by weight and the y units comprise from about 90 to about 10 percent by weight.

Such a preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

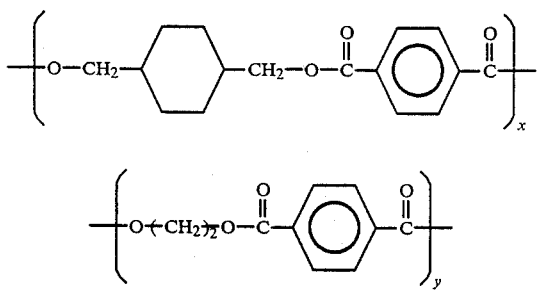

wherein x and y are as previously defined.

The polyesters described herein are either commercially available or can be produced by methods well known in the art, such as those set forth in, for example, U.S. Pat. No. 2,901,466.

The polyesters used herein have an intrinsic viscosity of from about 0.4 to about 2.0 dl/g as measured in a 60:40 phenol:tetrachloroethane mixture or similar solvent at 23°–30° C.

The poly(etherimide ester) elastomers used herein may be prepared from one or more diols, one or more dicarboxylic acids and one or more high molecular weight polyoxyalkylene diimide diacids. Preparation of such materials is described in detail in U.S. Pat. No. 4,556,705 of R. J. McCready, issued Dec. 3, 1985 and hereby incorporated by reference.

The poly(etherimide ester) elastomer used herein may be prepared by conventional processes, such as esterification and condensation reactions for the production of polyesters, to provide random or block copolymers. Thus, poly(etherimide esters) may be generally characterized as the reaction product of the aforementioned diols and acids.

Vinyl aromatic polymer resins useful as component (A) are in general those having at least 25% of their units derived from a monomer having the formula

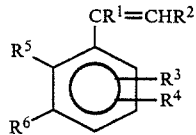

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbons or $R^5$ and $R^6$ may be concatenated together with hydrocarbyl groups to form a naphthyl group.

Materials that may be copolymerized with the units of the vinyl aromatic monomer include those having the general formula:

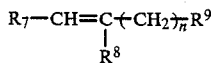

wherein $R^7$ and $R^8$ represent a substituent selected from the group consisting of hydrogen, halogen, an alkyl group of 1 to 4 carbon atoms, carboalkoxy or $R^7$ and $R^8$ taken together represent an anhydride linkage (—COOOC—) and $R^9$ is hydrogen, vinyl, an alkyl or alkenyl group having 1 to 12 bon atoms cycloalkyl carboalkoxy, alkoxy-alkyl, alkyl carboxyl, ketoxy, halogen, carboxy, cyano or pyridyl and n is 0 or a whole number between 1 and 9.

The general formula set forth includes by way of example, homopolymers such as polystyrene and polymonochlorostyrene, the modified polystyrenes, such as rubber-modified, high-impact polystyrene and the styrene containing copolymers such as the styrene/acrylonitrile copolymers, styrene/butadiene copolymers, styrene/acrylonitrile/alkyl styrene copolymers, styrene/acrylonitrile/butadiene copolymers, poly(alpha-methylstyrene), copolymers of ethylvinylbenzene, and divinylbenzene, styrene/maleic anhydride copolymers and styrene/butadiene block copolymers.

The rubber modified high impact polystyrenes may be made with diene rubbers such as butadiene rubber, styrene/butadiene rubber, acrylonitrile rubber or ethylene/propylene copolymers or EPDM rubber.

The ABS copolymers are well known and many suitable types are commercially available. Either an acrylonitrile/butadiene/styrene or an acrylonitrile/butadiene/alpha-methyl styrene may be used as the ABS component. A useful method for preparing these copolymers comprises grafting 73 parts styrene and 42 parts acrylonitrile onto polybutadiene latex containing 58 parts polybutadiene in the presence of 3 parts soap, 1.7 parts marcaptan and 0.4 parts potassium peroxydisulfate at 50° C. The latex is coagulated and the product is then milled for 10 minutes at 320° F. Other useful methods for preparing these, copolymers may be found in U.S. Pat. Nos. 2,550,349; 2,550,139; 2,698,313; U.K. Pat. No. 698,385; U.S. Pat. Nos. 2,713,566; 2,820,773; and 2,908,661, all of which are hereby incorporated by reference.

The polyphenylene ethers to which the present invention is applicable are known in the art and are described in numerous publications including Hay, U.S. Pat. Nos. 3,306,874 and 3,306,875 and generally comprise a plurality of structural units having the formula

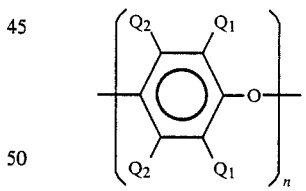

In each of said units independently, each $Q_1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q_2$ is independently hydrogen, halogen, primary or secondary lower alkyl, phenyl, haloalkyl, hydrocarbonoxy or halohydrocarbonoxy as defined for $Q_1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q_1$ is alkyl or phenyl, especially $C_{1-4}$ alkyl, and each $Q_2$ is hydrogen. Suitable polyphenylene ethers are disclosed in a large number of patents. The integer n is at least 50.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.35–0.6 dl/g, as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q_1$ is methyl and each $Q_2$ is hydrogen), whereupon the polymer may be characterized as poly(2,6-dimethyl-1,4-phenylene ether), and 2,3,6-trimethylphenol (wherein each $Q_1$ and one $Q_2$ is methyl and the other $Q_2$ is hydrogen).

The flatting agent of the present invention is made sequentially by a process which begins with a co-homopolymerization process.

Co-homopolymerization refers to a polymerization step where two distinct polymerization mechanisms are effected concurrently, including simultaneously. In particular, the first stage co-homopolymerization may encompass a siloxane polymerization (e.g., ring opening and condensation mechanism) in conjunction with a concurrent vinyl polymerization. The discrete mechanisms are not seen as competing with each other, but rather, two homopolymers are concurrently produced, each retaining its own structure.

The co-homopolymerization process may provide two discrete networks rather than a random copolymer. While not intending to be bound by any theory, it is possible that the network(s) comprises two or more distinct interpenetrating polymer phases, which provides the additional strength needed in the polyorganosiloxane. This is evidenced by the two distinct glass transition temperatures which can be detected by differential scanning calorimetry. Preferably, the product of the co-homopolymerization process is rubbery instead of a resin-like powder.

Subsequent to the co-homopolymerization of the siloxanes and vinyl-based monomers of the first step, at least one additional graft polymerization process is utilized to achieve the multi-stage polyorganosiloxane/polyvinyl-based graft polymers of the present invention.

Essential to the present invention; however, is that the outermost graft stage be comprised of a vinyl-aromatic based polymer. It has been found that styrene/acrylonitrile copolymer or styrene/divinylbenzene copolymer is particularly effective as the second stage graft polymer or copolymer, or as the outermost stage when intermediary stages are optionally utilized.

The foregoing polyorganosiloxane/polyvinyl-based graft polymer can be isolated and utilized as a flatting agent for thermoplastic resins as will be discussed in detail below.

Additional cross-linking and/or graft-linking agent(s) can be utilized in this initial stage to provide co-homopolymerized networks from both polymeric constituents which provide greater rubber integrity.

The first stage rubbery substrate is provided by a series of sequential processing steps. In a premixing step, the ingredients required for the co-homopolymerization of the organosiloxane(s) and vinyl-based monomer(s) are premixed with water and suitable crosslinker(s), graft-linker(s), initiator(s) and surfactant(s). The premixed ingredients are homogenized by conventional means. The co-homopolymerization reactions may begin at this early stage of the process, but these reactions are generally slow at room temperature. The homogenized reactants may be directed to a reactor vessel, typically stainless steel or glass flasks, under a nitrogen blanket. Heat is applied to facilitate the reaction. For typical 5 to 50 gallon stainless steel reactors, a 3 to 6 hour residence time at 75 to 90 degrees centigrade is adequate to complete the co-homopolymerizations. Cooling for 2 to 6 hours will typically reduce the temperature to at least room temperature where the reaction mass can be held for 3 to 72 hours. Cooling to lower temperatures (e.g. 5 degrees centigrade) may sometimes be preferred since this may enhance the properties of the formed polyorganosiloxane/polyvinyl substrate.

Cooling to room temperature or lower allows the polyorganosiloxane portion to build molecular weight, thereby minimizing the extractable silicone rubber fragments and optimizing physical properties of the product for certain applications Generally, lower temperatures are preferred when it is desirable to optimize the elasticity of the formed polyorganosiloxane/polyvinyl substrate.

The initiator for the siloxane component of the co-homopolymerization can be any ionic ring opening type initiator when cyclic siloxanes are utilized, such as alkylarylsulfonic acids, alkyldiaryldisulfonic acids, alkylsulfonic acids or the like. The best suited example is dodecylbenzenesulfonic acid which can act as an initiator and at the same time as an emulsifier. In some cases, the joint use of a metal salt of an aforementioned sulfonic acid is also preferred.

The initiator for the styrenic or other vinyl-based monomers in the co-homopolymerization process can be any organic soluble radical initiator, such as azobisisobutyronitrile (AIBN) and the organic peroxides, e.g. benzoyl peroxide, dichlorobenzoyl peroxide and tert-butyl perbenzoate. Also suitable are water-soluble radical initiators such as the persulfates. Although it is possible to charge this type of initiator at the beginning of the process, it is preferred that it be charged continuously or incrementally during the co-homopolymerization period. Since persulfate is less stable in the acid conditions of the siloxane polymerization, it is preferred that the persulfate be added over time to keep the vinyl polymerization running. Particle size, pH and total solids measurements can be readily monitored at this stage of the process. A latex rubber emulsion prepared as described above will generally contain particles having an average diameter of 100 to 800 nanometers and preferably 150 to 400 nanometers. The particle size is particularly influenced by the homogenization pressure (and the number of passes through the homogenizer) and the composition of the reaction ingredients. A pressure range of 2000 to 12000 psi is typical and 3000 to 9000 psi is preferred. Multiple passes through the homogenizer may be preferred but on a large scale a single pass may be most practical.

The foregoing reaction steps must be followed by a suitable neutralization process to provide the products of the invention. The main object of the neutralization is to quench the siloxane polymerization. This is accomplished by adding a caustic solution such as sodium hydroxide, potassium hydroxide, potassium or sodium carbonate, sodium hydrogen carbonate, triethanolamine or triethylamine. The pH of the reaction solution may be raised from a level of 1 to 3 to a ph of at least about 6.5, and preferably 7 to 9.

It is often desirable to add additional soap or surfactant to the emulsion formed at the end of the first stage, prior to the neutralization step. Additional surfactant tends to facilitate avoidance of premature agglomeration or flocculation of the co-homopolymerized rubber in the quench step.

The foregoing co-homopolymerization process provides a rubbery network composed of a polyorganosiloxane/polyvinyl substrate. This substrate is the first stage of the graft polymer of the present invention. The next stage involves the graft polymerization of additional vinyl-functional moieties onto graft sites provided by the rubbery substrate particles in the latex formed in the first stage. Subsequent additional stages are optional but may be preferred for certain applications. The outermost graft stage is comprised of a vinyl aromatic-based polymer or cross-linked vinyl aromatic-based polymer.

The grafted polymers will preferably be the product of a vinyl polymerization process. Suitable vinyl monomers for graft polymerization include without limitation: alkenyl aromatic compounds such as styrene, divinylbenzene, alpha-methylstyrene, vinyl toluene, halogenated styrene and the like; vinyl cyanide compounds such as acrylonitrile and methacrylonitrile; olefins such as ethylene, propylene, butadiene, isoprene, and chloroprene; and other vinyl compounds such as acrylamides, N-(mono or disubstituted alkyl)acrylamides, vinyl acetate, vinyl chloride, vinyl alkyl ethers, allyl (meth)acrylate, triallyl isocyannurate, ethylene dimethacrylate, diallyl maleate, maleic anhydride; maleimide compounds such as maleimide, and N-phenyl (or alkyl)-maleimide and mixtures of these monomers.

The vinyl polymerization is accomplished in an emulsion; therefore, water soluble initiators are suitable, e.g. potassium persulfate, sodium persulfate and ammonium persulfate. It is practical to add the initiator at the beginning of this step, prior to charging the vinyl monomer for the second stage polymerization. Other Redox initiator systems, such as cumene hydroperoxide/ferrous sulfate/glucose/sodium pyrophosphate, can also be utilized at this stages as well as other organic peroxides.

Sequential multi-stage polymerization processes of this type are sometimes referred to as core-shell processes. It is preferred, however, to describe them as multi-stage graft polymerization processes wherein the initial stage provides a co-homopolymerized organosiloxane/vinyl-based substrate. This substrate may have sufficient graft sites for a second or subsequent stage to be grafted thereto. Grafted polystyrene, styrene/acrylonitrile copolymer, or styrene/divinylbenzene copolymer as the outermost stage is preferred, yet many other intermediary stages such as a butyl acrylate stage are also contemplated. Furthermore, the grafting of additional stages of the same or different kinds is also possible.

In general, the first stage comprising the co-homopolymerized polyorganosiloxane/polyvinyl-based substrate will comprise approximately 5 to 95 weight percent of the total graft polymer based upon the weight of the first stage and the subsequent stage or stages taken together. Preferably the first stage will comprise approximately 30 to 90 weight percent on the same basis. Correspondingly, the subsequent stages, comprising the additional grafted vinyl aromatic-based polymers will comprise 95 to 5 weight percent and preferably 70 to 10 weight percent on the same basis. In the multi-stage systems, preferably, the ratio of first stage substrate polymer (B)(a) to second stage polymer (b)(i) is 10:90 to 90:10 and the amount of third stage polymer (b)(ii) comprise from about 10 to about 90 parts by weight per 100 parts by weight of (B)(a), (b)(i) and (b)(ii) combined.

The organosiloxanes useful in the first stage co-homopolymerization are any of those known to produce silicone elastomers and may include those which are hydroxy-, vinyl-, hydride- or mercapto-end capped linear organosiloxane oligomers.

The polyorganosiloxanes illustratively will be comprised primarily of units of the formula

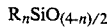

$$R_n SiO_{(4-n)/2}$$

wherein R is hydrogen or a monovalent hydrocarbon radical of about 1 to 16 carbon atoms and n is 0, 1 or 2.

Preferred among the organosiloxanes are those in cyclic form having three or more siloxane units and most preferred are those having three to six units. Such organosiloxanes include without limitation, for example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane and octaphenylcyclotetrasiloxane. These or similar organosiloxanes may be used alone or in combination.

The vinyl monomers useful in conjunction with the co-homopolymerization of organosiloxanes in the first stage are preferred to be alkenyl aromatic compounds such as styrene, divinylbenzene, alpha-methylstyrene, vinyltoluene, vinylnaphthalene, vinylanthracene, and halogenated styrene or its derivatives. Other suitable vinyl monomers include acrylic acids and acrylates such as methyl-, ethyl-, allyl-, or butylacrylate; methacrylates such as methyl methacrylate, and 2-ethylhexyl methacrylate; vinyl cyanides such as acrylonitrile, and methacrylonitrile; olefins such as ethylene, propylene, butadiene, isoprene, and chloroprene; and other vinyl compounds such as vinyl imidazole, 5-vinyl-2-norbornene, vinyl pyridine, vinyl pyrrolidone, vinyl acetate, vinyl alkyl ethers, vinyl chloride, vinyl furan, N-vinyl carbazole, allyl (meth)acrylate, triallyl isocyanurate, ethylene di(meth)acrylate, butylene di(meth)acrylate, diallyl maleate, maleic anhydride; maleimide compounds such as maleimide, and N-phenyl (or alkyl) maleimides; acrylamides; N-(mono or di-substituted)

acrylamides; and mixtures of any of these monomers. In general, any rubbery or glassy vinyl type monomer may be used which can be mixable with the organosiloxanes. Typically the vinyl component of the first stage co-homopolymer will be present in an amount of approximately 3 to 97 weight percent and correspondingly the polyorganosiloxane component will be present in an amount of approximately 97 to 3 weight percent. Preferably the vinyl component will comprise approximately 5 to 45 weight percent of the first stage of the co-homopolymerized substrate.

Platinum compounds are often utilized in conjunction with polyorganosiloxane compositions in order to enhance the flame retardance of the latter. Platinum complexes are also used as catalysts in certain hydrosilation processes although such catalysts are not necessary for the practice of the present invention. As flame retarding additives, however, there may optionally be utilized the reaction product of chloroplatinic acid and organosilicon compounds as described in U.S. Pat. No. 3,220,972. Another platinum compound is seen in U.S. Pat. No. 3,775,452 describing platinum-containing organopolysiloxanes.

The cross-linker composition used in conjunction with the organosiloxane component of the present compositions can have the general formula:

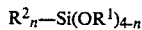
$$R^2_n-Si(OR^1)_{4-n}$$

wherein n is 0, 1, or 2, preferably 0 or 1 and each $R^1$ independently represents hydrogen or a monovalent hydrocarbon radical selected from among alkyl or aryl radicals having 1 to 16 carbon atoms, preferably methyl, ethyl and phenyl. $R^2$ can be the same as $R^1$ or can be a vinyl, alkenyl, thio, or (meth)acryloxyalkyl functional radical. When $R^2$ is a vinyl, alkenyl, thio, or acryloxyalkyl radical and the n is 1 the cross-linker compound can also act as a graft-linker.

A preferred cross-linker compound is tetraethoxysilane. A combination cross-linking and graft-linking compound is vinyltriethoxysilane. Another suitable choice is gamma-methacryloxypropyltrimethoxysilane.

The multi-stage polyorganosiloxane/polyvinyl-based graft product of the present invention can be isolated by conventional means such as hot solution coagulation. For example, an electrolytic solution of about 0.5 to 5 percent aluminum sulfate or magnesium sulfate in water can be prepared and heated to about 75° to 95° C. When the latex is added, with agitation, the graft product will precipitate and can be held at elevated temperature for about 10 minutes whereupon it may be filter washed. Commercial latex isolation techniques such as spray dryers may also be utilized.

The isolated multi-stage graft polymer may also be utilized as an impact modifier for thermoplastic resins as well as a flatting agent as described herein. Compounding impact strength improving amounts of the modifier together with a thermoplastic resin such as polycarbonate can be accomplished by conventional means such as a single or twin screw extruder. Typically 1 to 60 parts by weight of the silicone-based modifier can be incorporated in 100 parts of the thermoplastic resin.

The compositions can also be further rendered more flame retardant with effective amounts, e.g., between about 1 and 30 parts by weight per 100 parts by weight or resin of a flame retardant agent, e.g., elementary red phosphorous, phosphorous compounds, halogen compounds, nitrogen compounds, antimony oxide, zinc oxide, metal salt(s) of sulfonated diphenylsulfone, metal salt(s) of trichlorobenzene sulfonic acid, mixtures thereof and the like.

In addition, reinforcing fillers; dyes and colored pigments; heat stabilizers; thermooxidative stabilizers and UV stabilizers; waxes, lubricants and processing assistants which ensure trouble-free extrusion and injection molding; and antistatic agents may be added to the molding composition according to the invention.

Articles exhibiting a low gloss are formed in any conventional thermoforming process. Examples of thermoforming process include calendering to produce sheets and films; casting which comprises, pouring the molten polymer into molds to produce a wide variety of shaped articles and films; compression molding; extrusion which comprises converting polymer powders or granules into a continuous uniform melt and forcing the melt through a variety of dies to yield a desired shape; injection molding wherein the polymer is melted and then injected into a mold cavity to form a wide variety of shapes depending upon the shape of the cavity in the mold; and heat forming wherein the thermoplastic material is heated to an elevated temperature to a workable level and then forming the material into the desired shape through any one of several techniques, illustratively, feeding the sheet or web through the system in increments; printing or decorating either before or after forming; notching, slotting, punching or reforming the original formed shape; adhering a label or other item; cutting or punching the shape from the remaining web; and counting, stacking, orienting and/or packaging the product. See Modern Plastics Encyclopedia/88 McGraw Hill 1987, pp. 203–300.

DESCRIPTION OF THE PREFERRED EMBODIMENTS

The following examples illustrate the present invention. They are not to be construed to limit the claims in any manner whatsoever.

A single slash is used between monomers of a single stage and a double slash or a hyphen is used as a shorthand method of indicating separation between stages. The first stage to be polymerized is written first before the double slash or hyphen, and subsequent stages are written subsequently.

EXAMPLES 1–2

General Procedure for Preparing Polyorganosiloxane/Polystyrene-S/AN (CSiM) Emulsion Polymers To a mixture consisting of 90 parts octamethylcyclotetrasiloxane (D4), 10 parts tetravinyltetramethylcyclotetrasiloxane (VMD4), minor amounts of siloxane derived cross- and graft-linkers (1.7 parts of tetraethoxysilane and 1.43 parts of gamma-methacryloxypropyltrimethoxysilane) and an optional chloroplatinic acid catalyst solution is added a styrenic mixture composed of styrene (33 parts on base of 100 parts of total D4 and VMD4) and divinylbenzene (0.67 parts). An organic soluble radical initiator may be added in the styrenic mixture at this stage or a water-soluble initiator to be added batchwise or incrementally added to the post-homogenization latex during the later stage of polymerization. The final organic mixtures are then added to an aqueous solution containing dissolved dodecylbenzene sulfonic acid which is followed by passing twice through a homogenizer at 4000–8000 psi.

The resulting pre-emulsified latex is then heated up to and co-homopolymerized at 75°-90° C. for 6 hours and allowed to stand overnight at room temperature before quenching with a neutralizing agent. The subsequent styrene/acrylonitrile (S/AN) comonomer of a 75/25 ratio, 30 parts based on the 70 parts of the dry silicone/-polystyrene (Si/PS) rubber substrate in the latex form, is then grafted to the substrate at 75° C. over a 3 to 6 hour period. A white grainy powder is then isolated by flocculating in a hot salt containing aqueous solution.

General Procedure of Blend Preparation

A dry blend of Lexan ®, a poly(bisphenol-A carbonate), a silicone-based impact modifier and other ingredients are tumble mixed on a jar shaker to give a homogeneous dispersion. The well mixed dry mixture is then extruded on a Werner Pfleiderer 30 mm twin screw extruder under normal operating conditions for Lexan. The dry, pelletized extrudate is then injection molded on a 75-ton Newbury molding machine into test specimens.

Testing For Gloss

Test specimens are measured for specular gloss at 60° by ASTM test method D-523-78 on a Gardner glossometer, model Glossguard II. The working standard is highly polished, plane, black glass. Results along with compositional data are set forth in Table 1 below.

COMPARATIVE EXAMPLE 1*

Lexan ® 110, a poly(bisphenol-A carbonate) is tumble mixed in a jar shaker with mold release agents, flame retardants and an impact modifier into a homogeneous dispersion. The well mixed dry mixture is then extruded on a Werner Pfleiderer 30 mm twin screw extruder under normal operating conditions for Lexan ®. The dry pelletized extrudate is then injection molded on a 75-ton Newbury molding machine into test specimens. The test specimens are then tested for gloss as described above, and the results are compiled in Table 1 below.

TABLE 1

| | Example | | |
|---|---|---|---|
| | 1* | 1 | 2 |
| Composition+ | | | |
| High flow polycarbonate (Lexan ® 110) | 100 | 100 | — |
| Medium flow polycarbonate (Lexan ® 145) | — | — | 100 |
| Additives for flame retarding and molding | 1.95 | 0 | 0 |
| PTFE Gloss Flatting Agent | 1.00 | 0 | 0 |
| Conventional Impact Modifier** | 5.00 | 0 | 0 |
| CSiM*** | — | 5.00 | 5.00 |
| Gloss | | | |
| 60° Gloss, % | 76 | 48 | 49 |

* = Control Sample
Note = All values, unless otherwise defined, are in parts per hundred resin
*** = (polyorganosiloxane/polystyrene-styrene/acrylonitrile) graft polymer, prepared according to Example 1
** = silicone-polycarbonate block copolymer
+ = All blends contain 2.0 weight % of $TiO_2$ and 0.05% of other color pigment As can be clearly seen from Table 1, samples prepared with the flatting agent of this invention significantly reduce gloss as compared to samples prepared with a conventional flatting agent. For comparison purposes a typical polycarbonate having no flatting agent, the gloss level would be about 100.

EXAMPLES 3-10

The general procedures of Example 1 are followed, using a different poly(bisphenol-A carbonate), commercially available as Lexan ® 125, varying the styrene/acrylonitrile copolymer, and employing a CSiM flatting agent prepared by the procedure of Example 1. In Examples 7-10 other conventional additives are also employed in varying quantities. Control Examples 3* and 4* having no flatting agent are also prepared for comparison purposes. Izod bar test specimens are also prepared and tested for notched Izod impact strength as per ASTM method D-256, and flammability ratings are determined in accordance with Underwriters Laboratories Bulletin 94 procedures, VO being the highest rating. For some of the test specimens, melt flow indices are also determined. The results and compositional information are set forth below in Table 2.

TABLE 2

| | | | Example | | | | | | | |
|---|---|---|---|---|---|---|---|---|---|---|
| | 3* | 4* | 3 | 4 | 5 | 6 | 7 | 8 | 9 | 10 |
| Composition (parts by weight) | | | | | | | | | | |
| Lexan ® 125 | 70 | 70 | 70 | 70 | 60 | 60 | 55.75 | 55.75 | 62.75 | 62.75 |
| S/AN-I | — | 30 | — | 25 | — | 30 | — | 25 | — | 20 |
| S/AN-II | 30 | — | 25 | — | 30 | — | 25 | — | 20 | — |
| CSiM | — | — | 5 | 5 | 10 | 10 | 8 | 8 | 6 | 6 |
| Flame retardant | — | — | — | — | — | — | 9.25 | 9.25 | 9.25 | 9.25 |
| $Sb_2O_3$ | — | — | — | — | — | — | 2 | 2 | 2 | 2 |
| Properties | | | | | | | | | | |
| Gloss, % | 90 | 90 | 80 | 80 | 55 | 47 | 57 | 60 | 60 | 63 |
| INI (RT) | 40 | 40 | 60** | 80** | 60** | 80** | 40** | 70** | 40** | 70** |
| MFI, g/10 min | 22 | 12 | 20 | 10 | 18 | 8 | 21 | 9 | 19 | 12 |
| UL94 flammability rating | | | | | | | | | | |
| 3.2 mm | — | — | — | — | — | — | VO | VO | VO | VO |

TABLE 2-continued

|  | 3* | 4* | Example 3 | 4 | 5 | 6 | 7 | 8 | 9 | 10 |
|---|---|---|---|---|---|---|---|---|---|---|
| 1.6 mm | — | — | — | — | — | — | VO | VO | VO | VO |

*Control Samples
**5 brittle failures out of 5
INI = Izod notched impact strength in J/m (0.01 inch notch radius)
MFI = Melt flow index at 300C/12N
Gloss = measured at 60 degree angle of incidence and reflection
Lexan ® 125 = poly(bisphenol-A carbonate), General Electric Company
S/AN-I = styrene/acrylonitrile resin-molecular weight 180,000; S/AN weight ratio of 69:31
S/AN-II = styrene/acrylonitrile resin-molecular weight 100,000; S/AN weight ratio of 69:31
CSiM = (Si/PS)-S/AN flatting agent, Example 1
$Sb_2O_3$ = Antimony oxide flame retardant As can be seen from Table 2, the polyorganosiloxane/polystyrene-based (CSiM) flatting agent of this invention is effective in a wide variety of compositions and articles made with the CSiM flatting agent exhibit a number of excellent properties in addition to a substantial reduction in gloss.

EXAMPLES 11-15

The general procedure of Example 1 is repeated substituting a variety of thermoplastic polymer resins for poly(bisphenol-A carbonate). Polyethylene terephthalate, poly(1,4-butylene terephthalate), poly(2,6-dimethyl-1,4-phenylene ether), polystyrene, and poly(2,6-dimethyl-1,4-phenylene ether)/polystyrene are employed as the thermoplastic resins. Articles having reduced gloss will be formed in accordance with this invention. With 20 parts by weight CSiM and 80 parts by weight poly(1,4-butylene terephthalate) (VALOX ® 315 of General Electric Company) gloss is reduced from 100 to 24.1

EXAMPLE 16

The general procedure of Example 1 is followed except 90 parts of styrene/acrylonitrile copolymer (Tyril ® 880B) is substituted as the thermoplastic polymer resin for poly(bisphenol-A carbonate). 10 parts by weight of the CSiM flatting agents is found to reduce gloss from 100 to 71.5.

EXAMPLE 17

The general procedure of Example 1 is followed except 90 parts of a thermoplastic polymer resin mixture comprising 70 parts of poly(1,4-butylene terephthalate) and 20 parts of a poly(etherimide ester) is substituted for poly(bisphenol-A carbonate). Addition of 10 parts by weight of the CSiM flatting agent is found to reduce gloss from 89.8 to 52.1

EXAMPLE 18

The first stage production of the silicone/polystyrene-based rubber substrate is the same as described in Example 1. At the second stage, to the silicone/polystyrene latex is added one stream containing butylacrylate, butylene glycol diacrylate, diallyl maleate, deionized water and sodium dodecylbenzenesulfonate concurrently with another aqueous stream consisting of a water-soluble initiator over a period of 1 to 3 hours at 75° C. The butylacrylate to the dry silicone/polystyrene-based rubber weight ratio is aimed at 35/35. The S/AN grafting procedure is repeated here from Example 1 and so are the isolation steps. 10 parts by weight of this flatting agent is added to 90 parts by weight of styrene/ acrylonitrile copolymer (Tyril ® 880B). Gloss in the Tyril ® 880B is found to be reduced from 100 to 75.1 by the addition of the flatting agent.

EXAMPLE 19

A composition comprising 39 parts poly(1,4-butylene terephthalate), 46 parts poly(bisphenol A carbonate), 1.7 parts stabilizers, 1 part red pigment and 14 parts CSiM (Example 1) is prepared, molded and tested. For comparison purposes 14 parts Acryloid ® KM 653 (product of Rohm & Haas Company) butadiene-based impact modifier is substituted for the CSiM impact modifier. 60° gloss with the conventional impact modifier, 94.2, is reduced to a desirable level, 27.2.

The above mentioned patents, patent applications and publications are incorporated herein by reference as are the Standard Test Methods.

Many variations of the present invention will suggest themselves to those skilled in this art in light of the above detailed description. For example, the aromatic polycarbonate can be replaced in whole or in part with a polyester carbonate containing units derived from bisphenol-A, phosgene and terephthaloyl chloride and/or isophthaloyl chloride. The aromatic polycarbonate can be replaced in whole or in part by a polycarbonate containing units of bis(3,5-dimethyl-4-hydroxy phenyl)-sulfone, alone, or combined with bisphenol-A. The poly(ethylene terephthalate) can be replaced in whole or in part by poly(1,4-butylene terephthalate) or by a polyester derived from 1,4-cyclohexanedimethanol alone or combined with ethylene glycol and terephthalic acid and/or isophthalic acid. The polyester can be replaced in whole or in part by a styrenic resin, such as polystyrene or an acrylonitrile/styrene/butadiene terpolymer, or by a styrene/maleic anhydride copolymer.

The polyphenylene ether can be replaced in whole or in part by poly(2,6-dimethyl-co-2,3,6-trimethyl-1,4-phenylene ether).

All such obvious modifications are within the full intended scope of the appended claims.

We claim:
1. An extruded, molded or heat formed article having a flatted surface comprising:
(A) a thermoplastic polymer resin selected from an aromatic polycarbonate; a polyester carbonate; an aromatic dihydric phenyl sulfone carbonate polymer; a polyester resin prepared by reacting units of an aliphatic diol, a cycloaliphatic diol or a mixture of such diols, and an aromatic diacid; a poly(etherimide ester) elastomer; a vinyl aromatic polymer; a polyphenylene ether; or a mixture of any of the foregoing; and an effective, flatting amount of a flatting agent comprising a multi-stage polyorganosiloxane/polyvinyl-based graft polymer composition (B) comprising:
(a) as a first stage, a substrate selected from
  (i) a polymeric co-homopolymerized substrate comprised of, in combination, an organosiloxane polymer and at least one vinyl-based polymer;
  (ii) a polymeric co-homopolymerized substrate comprised of, in combination, an organosiloxane polymer, at least one vinyl-based polymer, and units which are derived from a cross linking agent or agents;
  (iii) a polymeric co-homopolymerized substrate comprised of, in combination, an organosiloxane polymer, at least one vinyl-based polymer, and units which serve as a graft-linking agent or agents;
  (iv) a polymeric co-homopolymerized substrate comprised of, in combination, an organosiloxane polymer, at least one vinyl-based polymer, units which are derived from a cross-linking agent or agents and units from the same or different agent or agents which serve as a graft-linking agent or agents; or
  (v) a polymeric co-homopolymerized substrate comprised of, in combination, an organosiloxane polymer, at least one vinyl-based polymer, and a mixture of any of units which are derived from a crosslinking agent or agents, units which serve as a graft-linking agent or agents, or units derived from a cross-linking agent or agents and units from the same or different agent or agents which serve as a graft-linking agent or agents; and
(b) at least one subsequent stage or stages graft polymerized in the presence of any previous stages and which is comprised of a vinyl-based polymer or a cross-linked vinyl-based polymer, the outermost stage being comprised of a vinyl aromatic-based polymer or a cross-linked vinyl aromatic-based polymer.

2. An article as defined in claim 1 wherein said thermoplastic polymer resin comprises an aromatic polycarbonate, a styrene/acrylonitrile copolymer, a poly(1,4-butylene terephthalate), a poly(etherimide ester) elastomer, a polyphenylene ether, a polystyrene or a mixture of any of the foregoing.

3. An article as defined in claim 2 wherein said thermoplastic polymer resin comprises poly(bisphenol-A carbonate).

4. An article as defined in claim 2 wherein said thermoplastic polymer resin comprises a styrene/acrylonitrile copolymer resin.

5. An article as defined in claim 1 wherein said organosiloxane/vinyl-based co-homopolymerized first stage substrate (B)(a) comprises approximately 5 to 95 weight percent of the total graft polymer composition based upon the weight of said first stage substrate and any subsequent graft stage or stages taken together.

6. A composition as defined in claim 5 wherein said first stage substrate (B)(a) comprises approximately 30 to 90 weight percent of the total graft polymer composition (B).

7. An article as defined in claim 1 wherein said first stage substrate (B)(a) is comprised of approximately 3 to 97 weight percent of organosiloxane polymer and correspondingly 97 to 3 weight percent of vinyl-based polymer.

8. An article as defined in claim 7 wherein said first stage substrate (B)(a) is comprised of approximately 5 to 45 weight percent vinyl-based polymer.

9. An article as define in claim 1 wherein said organosiloxane polymer is comprised primarily of a mixture of units of the formula

wherein R is hydrogen or a monovalent hydrocarbon radical of about 1 to 16 carbon atoms and n is 0, 1 or 2.

10. An article as defined in claim 1 wherein the vinyl-based polymer component of said first stage substrate (B)(a) is comprised primarily of alkenyl aromatic units, (meth)acrylate units or a mixture thereof.

11. An article as defined in claim 10 wherein said vinyl-based polymer comprises polystyrene.

12. An article as defined in claim 1 wherein said vinyl-based polymer component of said first stage substrate is comprised primarily of divinylbenzene units and other alkenyl aromatic units.

13. An article as defined in claim 1 wherein said vinyl aromatic-based polymer in any subsequent stage (B)(b) also includes monomers selected from the group consisting of vinyl cyanide compounds, maleimide compounds, acrylamide compounds and mixtures of any of the foregoing.

14. An article as defined in claim 13 wherein the vinyl aromatic-based polymer is selected from the group consisting of polystyrene, styrene/acrylonitrile copolymer, styrene/divinylbenzene copolymer and styrene/acrylonitrile/divinylbenene terpolymer.

15. An article as defined in claim 1 wherein in component (B) said subsequent stages comprise
  (b)(i) a second stage comprising at least one polymer and optionally units derived from a cross-linking agent or agents, units which serve as a graft-linking agent or agents, units derived from a cross-linking agent or agents and units from the same agent or agents which serve as a graft-linking agent or agents, or a mixture of any of the foregoing; and
  (b)(ii) a third stage comprising at least one vinyl aromatic-based polymer or a cross-linked vinyl aromatic-based polymer which is the same as, or different than (b)(i).

16. A composition as defined in claim 15 wherein the ratio of first stage substrate (B)(a) to second stage polymer (b)(i) is 10:90 to 90:10 and the amount of third stage (b)(ii) comprises from about 10 to about 90 parts by weight per 100 parts by weight of (B)(a), (b)(i), and (b)(ii) combined.

17. A composition as defined in claim 15 wherein subsequent stage (b)(i) comprises a cross-linked butyl acrylate polymer and subsequent stage (b)(ii) comprises a styrene/acrylonitrile copolymer.

18. An article as defined in claim 1 wherein said thermoplastic polymer resin also includes an effective amount of a flame retardant agent.

19. An article as defined in claim 15 wherein said thermoplastic polymer resin also includes an effective amount of a flame retardant agent.

20. A method for preparing an article having a flatted surface comprising extruding, molding or heat forming a blended composition, said blended composition comprising:
(A) a thermoplastic polymer resin selected from an aromatic polycarbonate; a polyester carbonate; an aromatic dihydric phenyl sulfone carbonate; a polyester resin prepared by reacting units of an aliphatic diol, a cycloaliphatic diol or a mixture of such diols, and an aromatic diacid; a poly(etherimide ester) elastomer; a vinyl aromatic polymer; a polyphenylene ether or a mixture of any of the foregoing; and blending with said thermoplastic polymer composition before or during processing an effective, flatting amount of a multi-stage polyorganosiloxane/polyvinyl-based graft polymer composition (B) comprising:
(a) as a first stage, a substrate selected from
  (i) a polymeric co-homopolymerized substrate comprised of, in combination, organosiloxane polymer and at least one vinyl-based polymer;
  (ii) a polymeric co-homopolymerized substrate comprised of, in combination, an organosiloxane polymer, at least one vinyl-based polymer, and units which are derived from a cross-linking agent or agents;
  (iii) a polymeric co-homopolymerized substrate comprised of, in combination, an organosiloxane polymer, at least one vinyl-based polymer, and units which serve as a graft-linking agent or agents;
  (iv) a polymeric co-homopolymerized substrate comprised of, in combination, an organosiloxane polymer, at least one vinyl-based polymer, units which are derived from a cross-linking agent or agents and units from the same or different agent or agents which serve as a graft-linking agent or agents; or
  (v) a polymeric co-homopolymerized substrate comprised of, in combination, an organosiloxane polymer, at least one vinyl-based polymer, and a mixture of any of units which are derived from a cross-linking agent or agents, units which serve as a graft-linking agent or agents, or units derived from a cross-linking agent or agents and units from the same or different agent or agents which serve as a graft-linking agent or agents; and
(b) at least one subsequent stage or stages graft polymerized in the presence of any previous stages and which is comprised of a vinyl-based polymer or a cross-linked vinyl-based polymer, the outermost stage being comprised of a vinyl aromatic-based polymer or a cross linked vinyl aromatic-based polymer.

21. A method as defined in claim 20 wherein said thermoplastic polymer resin is selected from an aromatic polycarbonate, a styrene/acrylonitrile copolymer, a poly(1,4-butylene terephthalate), a poly(etherimide ester) elastomer, a polyphenylene ether or a mixture of any of the foregoing.

22. A method as defined in claim 21 wherein said thermoplastic polymer resin comprises poly(bisphenol-A carbonate).

23. A method as defined in claim 21 wherein said thermoplastic polymer resin comprises a styrene/acrylonitrile copolymer resin.

24. A method as defined in claim 20 wherein said organosiloxane/vinyl-based polymer first stage substrate (B)(a) comprises approximately 5 to 95 weight percent of the total graft polymer composition based upon the weight of said first stage substrate and any subsequent graft stage or stages taken together.

25. A method as defined in claim 24 wherein said first stage substrate (B)(a) comprises approximately 30 to 90 weight percent of the total graft polymer composition.

26. A method as defined in claim 20 wherein said first stage substrate (B)(a) is comprised of approximately 3 to 97 weight percent of organosiloxane polymer and correspondingly 97 to 3 weight percent of vinyl-based polymer.

27. A method as defined in claim 26, wherein said first stage substrate (B)(a) is comprised of approximately 5 to 45 weight percent vinyl-based polymer.

28. A method as defined in claim 20 wherein said organosiloxane polymer is comprised primarily of a mixture of units of the formula $$R_nSiO_{(4-n)/2}$$

wherein R is hydrogen or a monovalent hydrocarbon radical of about 1 to 16 carbon atoms and n is an integer 0, 1 or 2.

29. A method as defined in claim 20 wherein the vinyl-based polymer of said first stage substrate (B)(a) is comprised primarily of alkenyl aromatic units, (meth)acrylate units or a mixture thereof.

30. A method as defined in claim 29 wherein said vinyl-based polymer comprises polystyrene.

31. A method as defined in claim 20 wherein said vinyl-based polymer component of said first stage substrate is comprised primarily of divinylbenzene units and other alkenyl aromatic units.

32. A method as defined in claim 20 wherein said vinyl aromatic-based polymer in any subsequent stage (B)(b) also comprises at least one selected from the group consisting of vinyl cyanide compounds, maleimide compounds and acrylamide compounds.

33. A method as defined in claim 32 wherein said vinyl aromatic-based polymer is selected from the group consisting of polystyrene, styrene/acrylonitrile copolymer, styrene/divinylbenzene copolymer, and styrene/acrylonitrile/divinylbenzene terpolymer.

34. A method as defined in claim 20 wherein said subsequent stages comprise
(b)(i) a second stage comprising at least one polymer and optionally units derived from a cross-linking agent or agents, units which serve as a graft-linking agent or agents, units derived from a cross-linking agent or agents and units from the same agent or agents which serve as a graft-linking agent or agents, or a mixture of any of the foregoing; and
(b)(ii) a third stage comprising at least one vinyl aromatic-based polymer or a cross-linked vinyl aromatic-based polymer which is the same as or different than (b)(i).

35. A method as defined in claim 34 wherein the ratio of first stage substrate polymer (B)(a) to second stage polymer (b)(i) is 10:90 to 90:10 and the amount of third stage (b)(ii) comprises from about 10 to about 90 parts by weight per 100 parts by weight of (B)(a), (b)(i), and (b)(ii) combined.

36. A method as defined in claim 34 wherein subsequent stage (b)(i) comprises a cross-linked butyl acrylate polymer and subsequent stage (b)(ii) comprises a styrene/acrylonitrile copolymer.

37. A method as defined in claim 20 wherein said thermoplastic polymer composition (A) also comprises an effective amount of flame retardant agent.

38. A method as defined in claim 34 wherein said thermoplastic polymer composition (A) also comprises an effective amount of flame retardant agent.

39. A method as defined in claim 20 wherein said flatted article exhibits a 60 degree gloss of no greater than about 75 percent as measured by ASTM D-523 on a Gardner glossometer.

40. A method as defined in claim 34 wherein said flatted article exhibits a 60 degree gloss of no greater than about 75 percent as measured by ASTM D-523 on a Gardner glossmeter.

* * * * *